US011046311B2

(12) United States Patent
Hirano (10) Patent No.: US 11,046,311 B2
(45) Date of Patent: Jun. 29, 2021

(54) VEHICLE CONTROL METHOD AND VEHICLE CONTROL DEVICE

(71) Applicant: Nissan Motor Co., Ltd., Yokohama (JP)

(72) Inventor: Tomohisa Hirano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/958,164

(22) PCT Filed: Jan. 22, 2018

(86) PCT No.: PCT/JP2018/001763
§ 371 (c)(1),
(2) Date: Jun. 26, 2020

(87) PCT Pub. No.: WO2019/142357
PCT Pub. Date: Jul. 25, 2019

(65) Prior Publication Data
US 2020/0361463 A1 Nov. 19, 2020

(51) Int. Cl.
*B60W 10/06* (2006.01)
*B60W 10/10* (2012.01)
(Continued)

(52) U.S. Cl.
CPC ............ *B60W 30/16* (2013.01); *B60W 10/06* (2013.01); *B60W 10/10* (2013.01);
(Continued)

(58) Field of Classification Search
CPC ................. B60W 30/16; B60W 30/17; B60W 30/18027; B60W 30/18063
See application file for complete search history.

(56) References Cited

U.S. PATENT DOCUMENTS 6,339,740 B1    1/2002  Seto et al.
6,820,709 B1   11/2004  Zimmermann et al.
(Continued)

FOREIGN PATENT DOCUMENTS

CN         1636783 A      7/2005
CN       102414069 A      4/2012
(Continued)

*Primary Examiner* — Anshul Sood
(74) *Attorney, Agent, or Firm* — Global IP Counselors, LLP (57) ABSTRACT

A vehicle control method is provide for automatically controlling an acceleration-deceleration rate control of a vehicle including starting and stopping. The vehicle control method performs the starting of the vehicle at a starting time with a first drive force which exceeds a starting friction force, which is a friction force acting on the vehicle at the starting time. Then, the vehicle control method switches to a second drive force after performing the starting. The second drive force is greater than the first drive force. The second drive force is a drive force that is necessary to make a headway distance to a preceding vehicle equal to a pre-set headway distance when there is a preceding vehicle. The second drive force is a drive force that is necessary to accelerate to a pre-set vehicle speed when there is no the preceding vehicle.

7 Claims, 7 Drawing Sheets

(51) Int. Cl.
  *B60W 30/16*   (2020.01)
  *B60W 30/14*   (2006.01)
  *B60W 40/076*  (2012.01)

(52) U.S. Cl.
  CPC ........ *B60W 30/143* (2013.01); *B60W 40/076* (2013.01); *B60W 2520/00* (2013.01); *B60W 2552/15* (2020.02)

(56) References Cited

U.S. PATENT DOCUMENTS

| | | | |
|---|---|---|---|
| 7,412,317 B2 | 8/2008 | Takamatsu et al. | |
| 7,715,275 B2 | 5/2010 | Boecker et al. | |
| 9,308,914 B1* | 4/2016 | Sun | B60K 28/06 |
| 2011/0022284 A1* | 1/2011 | Umakoshi | B60W 50/06 |
| | | | 701/70 |
| 2012/0046844 A1* | 2/2012 | Okada | B60W 10/184 |
| | | | 701/70 |
| 2013/0204505 A1* | 8/2013 | Sauer | B60W 50/0098 |
| | | | 701/96 |
| 2014/0365054 A1* | 12/2014 | Yamamoto | B60L 7/14 |
| | | | 701/22 |
| 2015/0266476 A1* | 9/2015 | Sangameswaran | B60W 10/04 |
| | | | 701/93 |
| 2016/0016469 A1 | 1/2016 | Yamada | |
| 2019/0135282 A1* | 5/2019 | Sakaguchi | B60W 30/18027 |

FOREIGN PATENT DOCUMENTS

| | | |
|---|---|---|
| CN | 106438980 A | 2/2017 |
| DE | 10 2013 208 859 A1 | 11/2013 |
| EP | 2 045 162 A2 | 4/2009 |
| JP | 11-66499 A | 3/1999 |
| JP | 2000-43618 A | 2/2000 |
| JP | 2001-39181 A | 2/2001 |
| JP | 2002-234358 A | 8/2002 |
| JP | 2008-514937 A | 5/2008 |
| JP | 2010-269671 A | 12/2010 |
| JP | 2014-66354 A | 4/2014 |
| JP | 2017-222317 A | 12/2017 |
| WO | 2006/034893 A1 | 4/2006 |

* cited by examiner

VEHICLE CONTROL METHOD AND VEHICLE CONTROL DEVICE

CROSS-REFERENCE TO RELATED APPLICATIONS

This application is a U.S. national stage application of International Application No. PCT/JP2018/001763, filed on Jan. 22, 2018.

TECHNICAL FIELD

The present invention relates to a vehicle control for starting and stopping without an operation by a driver.

BACKGROUND INFORMATION

As an example of vehicle control for starting and stopping without an operation by a driver, JP 2002-234358 A discloses control whereby, when a preceding vehicle is present, the vehicle travels so as to follow the preceding vehicle while maintaining a pre-set headway distance, and when there is no preceding vehicle, the vehicle travels so as to maintain a pre-set vehicle speed. In the control disclosed in the document above, when starting so as to follow the preceding vehicle, or when starting from a state of having stopped in response to a stop signal or the like, a drive force is controlled so that the vehicle accelerates at an acceleration rate that corresponds to the headway distance to the preceding vehicle or to a pre-set vehicle speed.

SUMMARY

In order for a vehicle to accelerate, a drive force is necessary that is greater than a resistance force acting on the vehicle. The main resistance forces acting on the vehicle are a static friction force when the vehicle is stopped, and a kinetic friction force when the vehicle is traveling. The static friction force is greater than the kinetic friction force. Specifically, a larger drive force is required to accelerate the vehicle at a predetermined acceleration rate when bringing the vehicle into a traveling state from a stopped state ("starting time" hereinbelow) than when accelerating the vehicle in a traveling state. In other words, to the degree that the resistance force acting on the vehicle is larger at the starting time of the vehicle, energy loss is greater at the starting time than when accelerating from a traveling state. Fuel consumption also increases the larger the generated drive force is. Therefore, from the perspective of fuel efficiency, there is room for improvement in the control described in the document above, in which acceleration at the starting time, which involves a large energy loss, is performed at the same acceleration rate as in a traveling state.

Therefore, an object of the present invention is to suppress fuel consumption at the starting time and enhance fuel efficiency in control for starting and stopping without an operation by the driver.

According to an aspect of the present invention, there is provided a vehicle control method for automatically controlling an acceleration-deceleration rate control of a vehicle including starting and stopping, that comprises performing the starting of the vehicle at a starting time with a first drive force which exceeds a starting friction force, which is a friction force acting on the vehicle at the starting time; and switching to a second drive force that is greater than the first drive force after performing the starting.

DETAILED DESCRIPTION OF EMBODIMENTS

Embodiments of the present invention are described below with reference to the accompanying drawings.

First Embodiment

Figure 1:
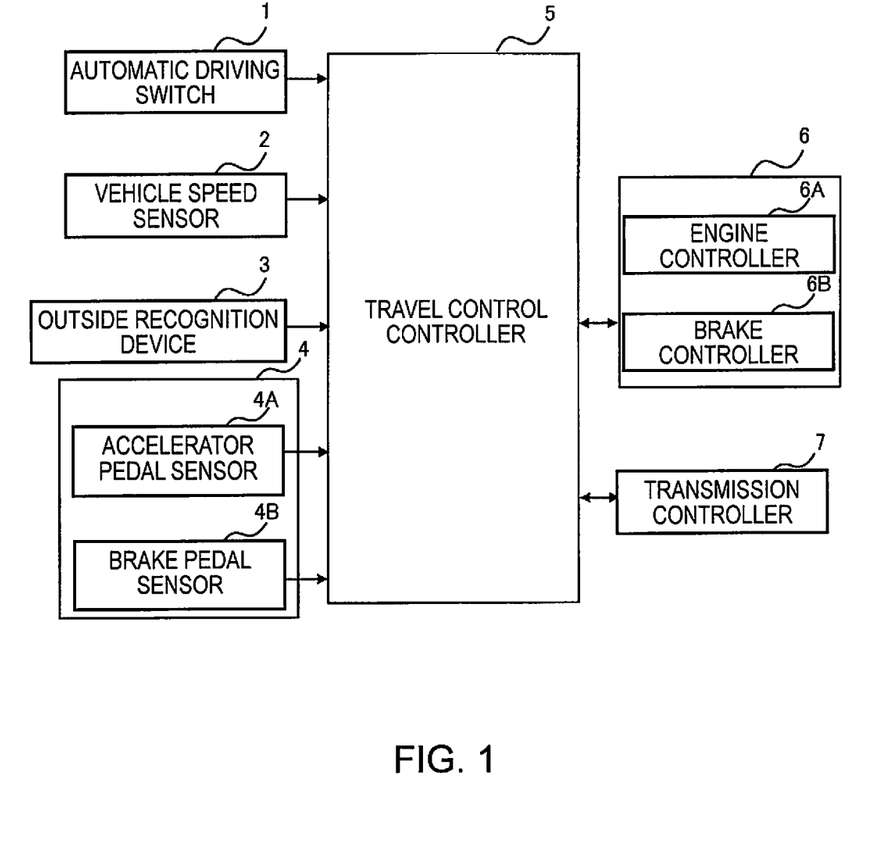
FIG. 1 is a block diagram of a vehicle control system pertaining to a first embodiment.

A first embodiment will be described with reference to FIGS. 1 to 4. FIG. 1 is a block diagram of a vehicle control system according to the first embodiment.

A vehicle according to the present embodiment is provided with an internal combustion engine ("engine" hereinbelow) as a drive source, and drive force generated by the engine is transmitted to a transmission via a torque converter.

An automatic driving switch 1 is a switch for instructing to set off and stop an automatic driving mode in which acceleration-deceleration rate control is performed automatically without an operation by a driver, or instructing to change a vehicle speed, acceleration, etc., during execution of the automatic driving mode. A state of the automatic driving switch 1 is outputted to a travel control controller 5 described hereinafter.

A vehicle speed sensor 2 is a sensor for detecting a vehicle speed of a host vehicle, and is constituted from a rotary encoder or other pulse generator for measuring a wheel speed, for example. Wheel speed information detected by the vehicle speed sensor 2 is outputted to the travel control controller 5 described hereinafter.

An outside recognition device 3 recognizes a preceding vehicle, a traffic signal, or the like in front of the host vehicle, and detects a state of the recognized preceding vehicle or traffic signal. Information about the detected preceding vehicle or traffic signal is outputted to the travel control controller 5 described hereinafter. The outside recognition device 3 is constituted from a radar and a camera, for example.

An accelerator pedal sensor 4A detects a depression of an accelerator pedal, which is an operating element operated by the driver to instruct acceleration. The detected accelerator pedal depression is outputted to the travel control controller 5 described hereinafter.

A brake pedal sensor 4B detects a depression of a brake pedal, which is an operating element operated by the driver to instruct deceleration. The detected brake pedal depression is outputted to the travel control controller 5 described hereinafter.

The accelerator pedal and the brake pedal constitute driving operating elements operated by the driver. The accelerator pedal sensor 4A and the brake pedal sensor 4B can also be referred to as a driving operating element action state detection means 4.

The travel control controller 5 as a travel control unit performs travel control based on the state of the automatic driving switch 1, the vehicle speed of the host vehicle based on a signal from the vehicle speed sensor 2, information relating to the outside acquired by the outside recognition device 3, and a state of the driving operating element action state detection means 4. Specifically, the travel control controller 5 performs automatic driving when the automatic driving switch 1 is ON. When there is a preceding vehicle in front of the host vehicle during automatic driving, the travel control controller 5 maintains a headway distance to the preceding vehicle at a predetermined distance which is set in advance, and sets a target vehicle speed for following travel and a target acceleration-deceleration rate that is based on the target vehicle speed. The travel control controller 5 calculates a target drive force or target braking force (also referred to collectively below as a target acceleration-deceleration rate controlled variable) for realizing the target acceleration-deceleration rate, and outputs the calculated target acceleration-deceleration rate controlled variable to an acceleration-deceleration rate control device 6. When there is no preceding vehicle during automatic driving, the travel control controller 5 sets a legal speed limit, for example, as the target vehicle speed, and sets a target acceleration rate that corresponds to the target vehicle speed. The travel control controller 5 also calculates a target acceleration-deceleration rate controlled variable for realizing the target acceleration-deceleration rate, and outputs the target acceleration-deceleration rate controlled variable to the acceleration-deceleration rate control device 6 described hereinafter. Starting control performed during automatic driving in the present embodiment will be described hereinafter.

During automatic driving, the travel control controller 5 sets a shift command value based on the items of information described above, and outputs the shift command value to a transmission controller 7.

The travel control controller 5 includes a microcomputer provided with a central computation device (CPU), read-only memory (ROM), random-access memory (RAM), and an input/output interface (I/O interface). The travel control controller 5 can also include a plurality of microcomputers.

The acceleration-deceleration rate control device 6 is provided with an engine controller 6A as a drive force control unit, and a brake controller 6B. The engine controller 6A controls a throttle valve position of the engine serving as the drive source based on a deceleration rate controlled variable inputted from the travel control controller 5. The brake controller 6B controls braking force based on the deceleration rate controlled variable inputted from the travel control controller 5. Control of braking force is performed by controlling fluid pressure of a hydraulic brake or an amount of regenerative electric power obtained by regenerative braking.

The starting control performed during automatic driving, executed by the travel control controller 5, will next be described.

When a preceding vehicle stops during following travel by automatic driving, the travel control controller 5 causes the host vehicle to stop at a pre-set headway distance for stopping, and causes the host vehicle to set off when the preceding vehicle has set off. In automatic driving in a state in which there is no preceding vehicle, the travel control controller 5 stops in response to a stop signal, for example, and sets off when a traffic signal changes from a stop signal to a travel signal.

In a state in which the vehicle is stopped, a resistance force acting on the vehicle is a static friction force acting between a wheel and a road surface, or a static friction force of components in a power transmission route of the vehicle. A drive force exceeding a maximum value of the static friction forces described above, i.e., a maximum static friction force, is necessary to cause the vehicle to set off. In the description below, the total of the maximum static friction force acting between a wheel and the road surface and the maximum static friction force acting on the components in the power transmission route of the vehicle is referred to as the resistance force at starting.

When the vehicle has begun to move, the resistance force acting on the vehicle changes from a static friction force to a kinetic friction force. The kinetic friction force is less than the static friction force.

In other words, to the degree that the resistance force acting on the vehicle is larger at the starting time of the vehicle, energy loss is greater at the starting time than when accelerating from a traveling state. In order to accelerate from starting at a target acceleration which is set based on the target speed, a greater drive force is required the greater the energy loss is, and this leads to decreased fuel efficiency.

Therefore, in order to enhance fuel efficiency during automatic driving, the travel control controller 5 performs the starting control in which starting is performed at a creep torque, and after starting, the drive force is switched to the drive force necessary for accelerating at the target acceleration rate which is set based on the target speed. The creep torque herein is the torque generated by the engine as the drive source while in an idling state. This starting control will be described in further detail with reference to the flowchart in FIG. 2.

Figure 2:
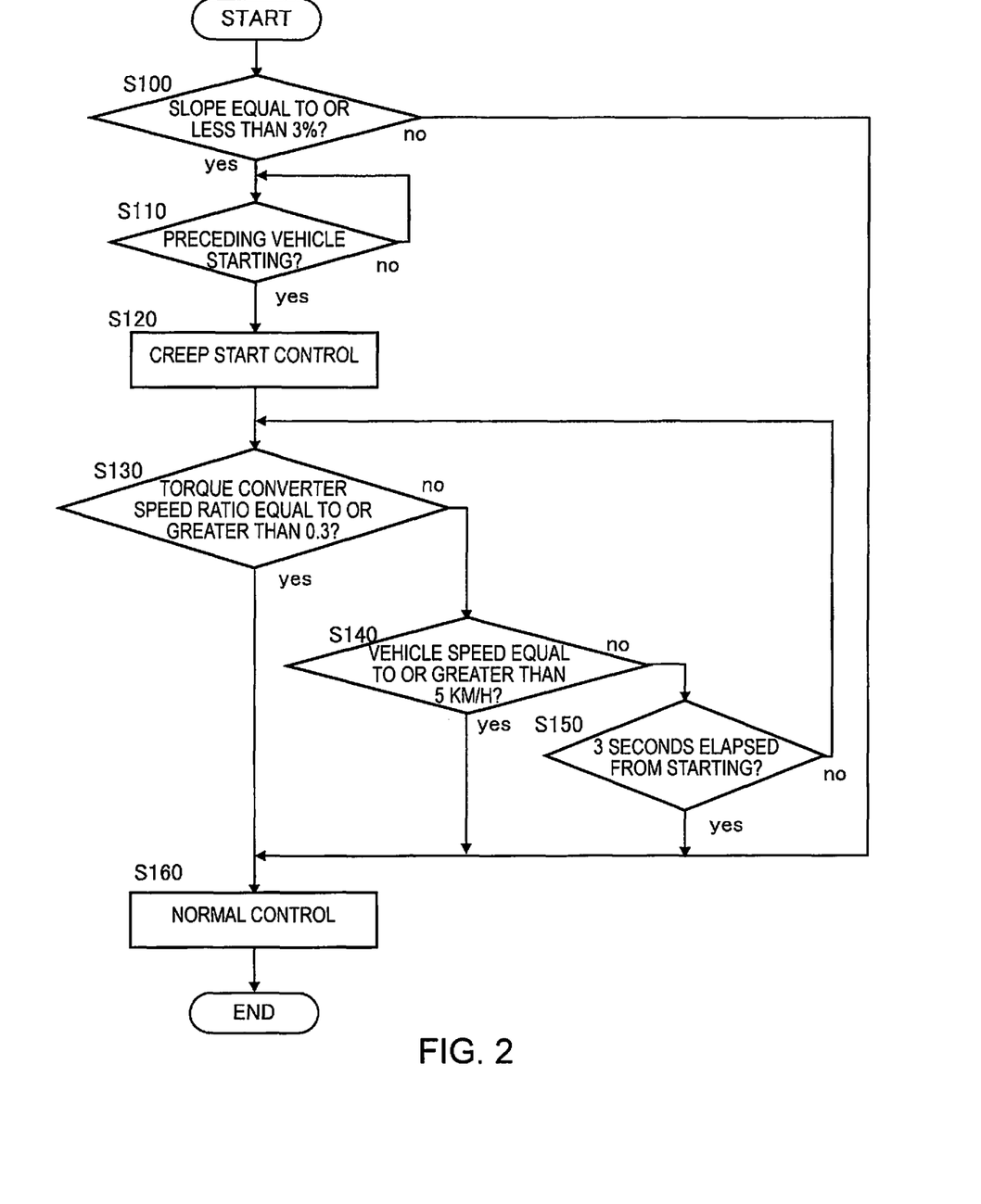
FIG. 2 is a flowchart illustrating a starting control routine pertaining to the first embodiment.

FIG. 2 is a flowchart illustrating a control routine in the starting control programmed in the travel control controller 5. This control routine is executed when the vehicle is stopped during automatic driving.

In step S100, the travel control controller 5 determines whether the road surface on which the vehicle is currently stopped is a flat road. For example, a slope is estimated using an acceleration sensor, and the road surface is determined to be a flat road when the slope is 3% or less. When it is determined that the road surface is a flat road, the travel control controller 5 executes the processing of step S110, and when it is determined that the road surface is not a flat road, the travel control controller 5 executes the processing of step S160. The travel control controller 5 executes normal control in step S160. The normal control herein is the automatic driving control described above. In other words, normal control is control in which, when there is a preceding vehicle, the target speed and the target acceleration-deceleration rate are set for travel so as to follow the preceding vehicle, and when there is no preceding vehicle, a predetermined target speed and target acceleration-deceleration rate are set, and the engine is caused to generate a drive force based on an arbitrary target acceleration-deceleration rate.

The purpose of this step is to determine whether starting is possible at the creep torque. As in the case of a typical vehicle, the creep torque in the vehicle pertaining to the present embodiment is greater than the resistance force at starting on a flat road, and starting at the creep torque is possible when the vehicle is on a flat road. The threshold value of 3% is an example of a slope at which starting by the creep torque is possible, i.e., a slope that can be considered to represent a flat road, and this threshold value is not limiting.

In step S110, the travel control controller 5 determines whether the preceding vehicle (front vehicle) in front of the host vehicle has set off, and when the preceding vehicle has set off, the travel control controller 5 executes the processing of step S120.

In step S120, the travel control controller 5 executes creep start control. Specifically, the transmission is controlled to a travel range, and the brake is released while the engine as the drive source is maintained in the idling state. In other words, creep start control is control for causing the vehicle to set off by creeping. The vehicle is caused to set off by creeping so as to reduce fuel consumption at the starting time, in which there is a large energy loss.

Depending on the specifications of the vehicle, the vehicle speed obtained from the creep torque may be less than the vehicle speed during creeping travel in general, and the driver may experience a sense of discomfort. In this case, the engine speed may be increased above the idling state so that a vehicle speed is attained that does not cause driver discomfort. Control for increasing the engine speed in this manner is included in the creep start control.

In step S130, the travel control controller 5 determines whether a speed ratio of the torque converter is equal to or greater than 0.3, and switches to normal control in step S160 when the speed ratio is equal to or greater than 0.3, and executes the processing of step S140 when the speed ratio is less than 0.3.

The speed ratio is a ratio of an output speed of the torque converter to an input speed of the torque converter. The input speed is equal to the engine speed. The output speed can be determined from the vehicle speed. In other words, the speed ratio can be determined from the engine speed and the vehicle speed. The engine speed during creep start control is maintained in the idling state. Consequently, the determination as to whether the speed ratio is equal to or greater than 0.3 can be made based on the vehicle speed. For example, the relationship between the vehicle speed during creeping travel and the speed ratio of the torque converter can be evaluated in advance and stored in the travel control controller 5, and the speed ratio can be determined to be equal to or greater than 0.3 when a vehicle speed is reached at which the speed ratio is equal to or greater than 0.3.

Figure 3:
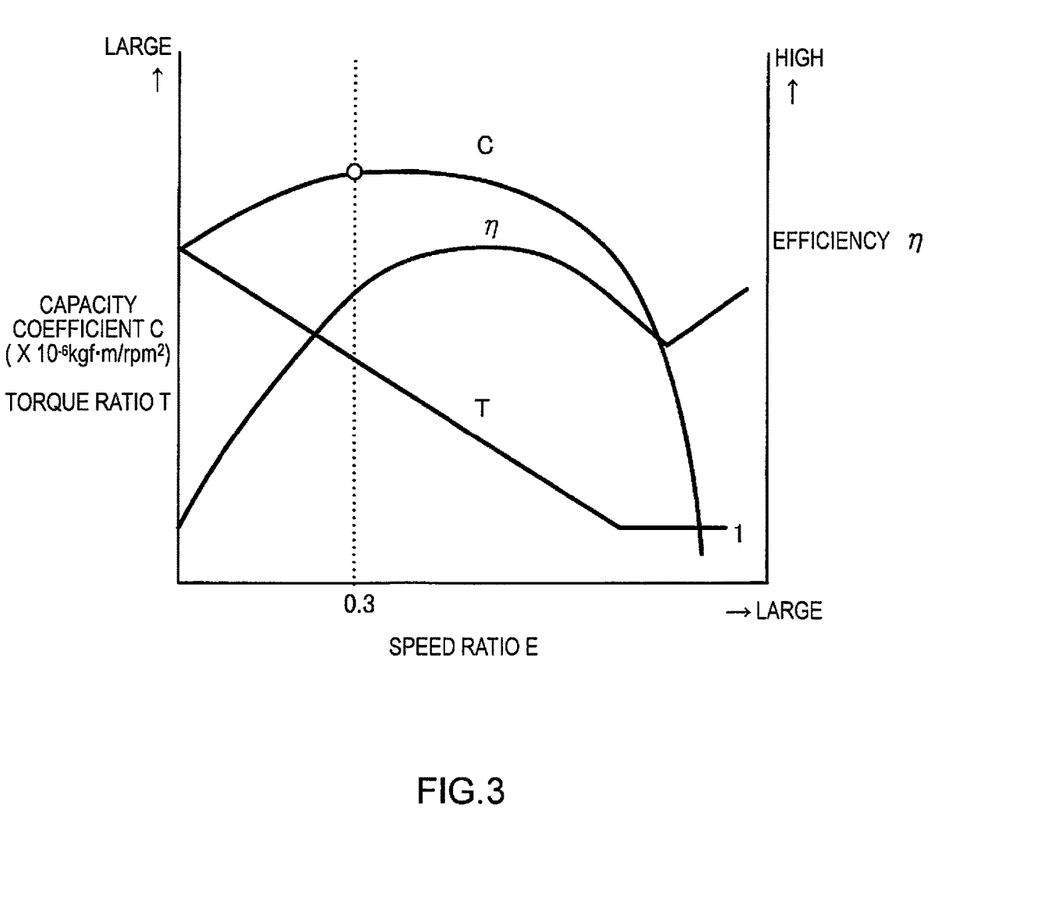
FIG. 3 is an example of a torque converter performance curve.

The reason for setting the threshold value of the speed ratio used for determination in this step to at least 0.3 will be explained with reference to FIG. 3. FIG. 3 is a performance curve of the torque converter used in the vehicle to which the present embodiment is applied.

Parameters representing the performance of the torque converter include a capacity coefficient C. The capacity coefficient C represents how readily the input speed is increased, and the larger the capacity coefficient C is, the less readily the input speed of the torque converter is increased. As indicated in FIG. 3, the capacity coefficient C increases in a speed ratio range of 0 to 0.3, and gradually decreases when the speed ratio exceeds 0.3.

In other words, the determination made in step S130 is a determination as to whether the current speed ratio is equal to or greater than the speed ratio at which the capacity coefficient C is at maximum. When the result of this determination is affirmative, the travel control controller 5 switches from creep start control to normal control, and when the result is negative, the travel control controller 5 continues creep start control. A variation in the drive force of the engine when switching from creep start control to normal control will be described hereinafter.

The reason for setting the threshold value of the speed ratio for determination to 0.3 will next be described.

In the torque converter, there is a delay between an increase in the input speed and an increase in the output speed. A condition can therefore occur in which the vehicle is not accelerated merely from an increase in the engine speed, even when the drive force of the engine is increased. Such revving of the engine leads to decreased fuel efficiency, and it is therefore preferred that switching from creep start control to normal control be timed so as to reduce revving of the engine.

First, a case is considered in which control is switched to normal control and the engine drive force is increased when the speed ratio is 0.3. In this case, since the capacity coefficient C is at maximum, the input speed of the torque converter, i.e., the engine speed, is least readily increased. Engine revving that accompanies switching to normal control can therefore be suppressed.

Second, a case is considered in which control is switched to normal control and the engine drive force is increased when the speed ratio is greater than 0.3. In this case, since the capacity coefficient C is smaller than when the speed ratio is 0.3, the engine speed readily increases immediately after switching to normal control. However, the increase in the output speed of the torque converter is delayed relative to the increase in the input speed thereof, due to a characteristic of the torque converter, and the speed ratio E decreases with an increase in the engine speed. As a result, the speed ratio approaches 0.3 and the capacity coefficient C increases, and an increase in the engine speed can be suppressed.

Third, a case is considered in which control is switched to normal control and the engine drive force is increased when the speed ratio is less than 0.3. In this case, when control is switched to normal control, the engine speed increases, and the capacity coefficient C accordingly decreases. The suppressing effect on the increase in engine speed is therefore less than when the speed ratio is equal to or greater than 0.3.

Based on the above, the present embodiment is configured so that control is switched from creep start control to normal control when the speed ratio is equal to or greater than 0.3, and engine revving that accompanies switching to normal control is suppressed.

When the speed ratio at which the capacity coefficient C is at maximum is not 0.3 but is another value, this other value is used as the threshold value.

Description of the flowchart resumes below.

In step S140, the travel control controller 5 determines whether the speed of the host vehicle is equal to or greater than 5 km/h, and when the vehicle speed is equal to or greater than 5 km/h, the travel control controller 5 switches to normal control in step S160, and when the vehicle speed is less than 5 km/h, the travel control controller 5 executes the processing of step S150.

In step S150, the travel control controller 5 determines whether an elapsed time from a creep start is equal to or greater than 3 seconds, and when the elapsed time is equal to or greater than 3 seconds, the travel control controller 5 switches to normal control in step S160, and when the elapsed time is less than 3 seconds, the travel control controller 5 returns to the processing of step S130.

The processing of steps S140 and S150 is performed to prevent creeping travel from continuing for too much time. Even when the speed ratio of the torque converter has not reached 0.3, the vehicle speed may sometimes be 5 km/h or more when a downward slope is encountered after starting, for example. Since continuing creeping travel in this case would disturb the flow of surrounding vehicles, control is quickly switched to normal control. Conditions in which the vehicle speed does not reach 5 km/h even 3 seconds or more after starting can include a condition in which a pebble or other obstacle or a rut offers resistance, for example, and creeping travel is not possible despite a flat road surface. Since continuing creep start control in such a condition would lead to decreased fuel efficiency, control is quickly switched to normal control.

In starting control during automatic driving in the present embodiment as described above, starting is performed from the creep torque, which is greater than the resistance force at the starting time, and control is switched to normal control at the timing at which an increase in the engine speed can be suppressed even when the drive force of the engine is increased (steps S120, S130, S160). Creeping travel is prevented from continuing too long based on the vehicle speed or the elapsed time after a creep start (steps S140, S150).

Figure 4:
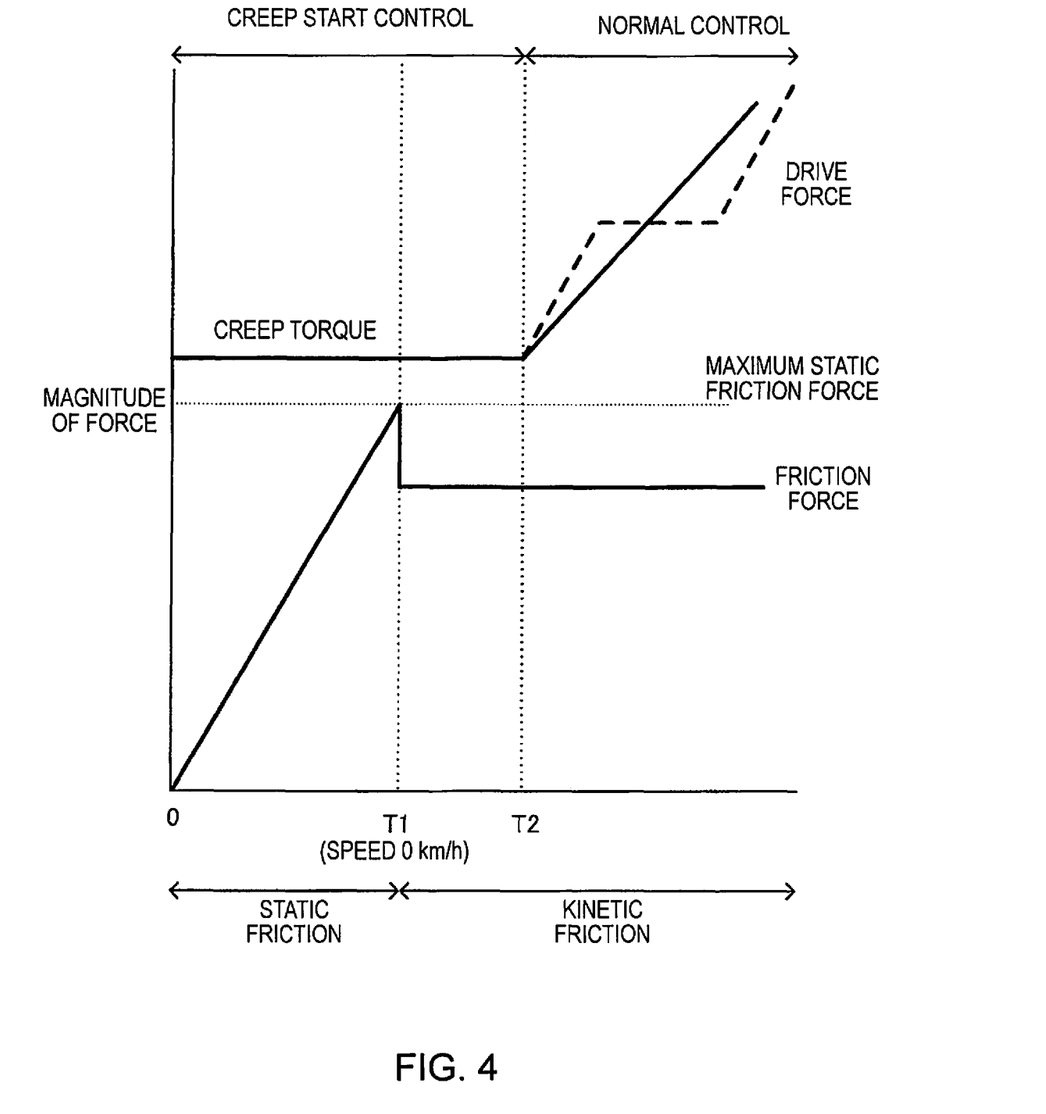
FIG. 4 is a timing chart for a case in which the starting control routine is executed.

FIG. 4 is a timing chart for a case in which the starting control described above is executed. The vertical axis represents force magnitude, and the horizontal axis represents time. The drive force indicated by a dashed line in the chart corresponds to another example of drive force control subsequent to the switch to normal control.

As indicated in FIG. 4, the travel control controller 5 causes the vehicle to set off from the creep torque in the present embodiment. Upon starting, the friction force acting on the vehicle transitions from a static friction force to a kinetic friction force and decreases, but the travel control controller 5 continues creep start control until a timing T2. At the timing T2 when the speed ratio of the torque converter becomes equal to or greater than 0.3, the travel control controller 5 switches from creep start control to normal control. The drive force of the engine increases as a result of switching to normal control. The method of increasing the drive force at this time may be a proportional increase as indicated by a solid line in FIG. 4, or a stepwise increase as indicated by the dashed line in FIG. 4.

In the present embodiment as described above, starting of the vehicle is performed at a starting time with a first drive force which exceeds the starting friction force, which is the friction force acting on the vehicle at the starting time, and the drive force switches to a second drive force greater than the first drive force after starting. Fuel consumption at the starting time, in which there is a large energy loss, is thereby suppressed, and fuel efficiency can be enhanced.

The second drive force in the present embodiment is a drive force based on the target acceleration-deceleration rate controlled variable in normal control. Specifically, when there is a preceding vehicle, the second drive force is the drive force that is necessary to make the headway distance to the preceding vehicle equal to the pre-set headway distance, and when there is no preceding vehicle, the second drive force is the drive force that is necessary for accelerating to a pre-set vehicle speed. By setting the second drive force in this manner, it is possible to rapidly accelerate after the friction force acting on the vehicle has decreased.

In the present embodiment, the timing of switching from the first drive force to the second drive force is the timing at which the vehicle speed of the host vehicle reaches a pre-set switching vehicle speed. The switching timing can thereby be determined using a vehicle speed sensor that is provided in an ordinary vehicle, and without providing a new detection device for the present embodiment.

In the present embodiment, the switching vehicle speed is the vehicle speed at which the speed ratio of the torque converter is equal to or greater than the speed ratio when the capacity coefficient of the torque converter is at maximum. It is thereby possible to suppress revving of the engine when control switches to normal control and the drive force is increased.

In the present embodiment, when a predetermined time elapses after starting, the drive force is switched to the second drive force even when the switching vehicle speed is not reached. Creeping travel can thereby be prevented from continuing for an unnecessarily long time.

In the present embodiment, the first drive force is set to a creep torque. Fuel consumption at the starting time can thereby be suppressed.

Second Embodiment

A second embodiment will be described with reference to FIGS. 5 and 6.

Figure 5:
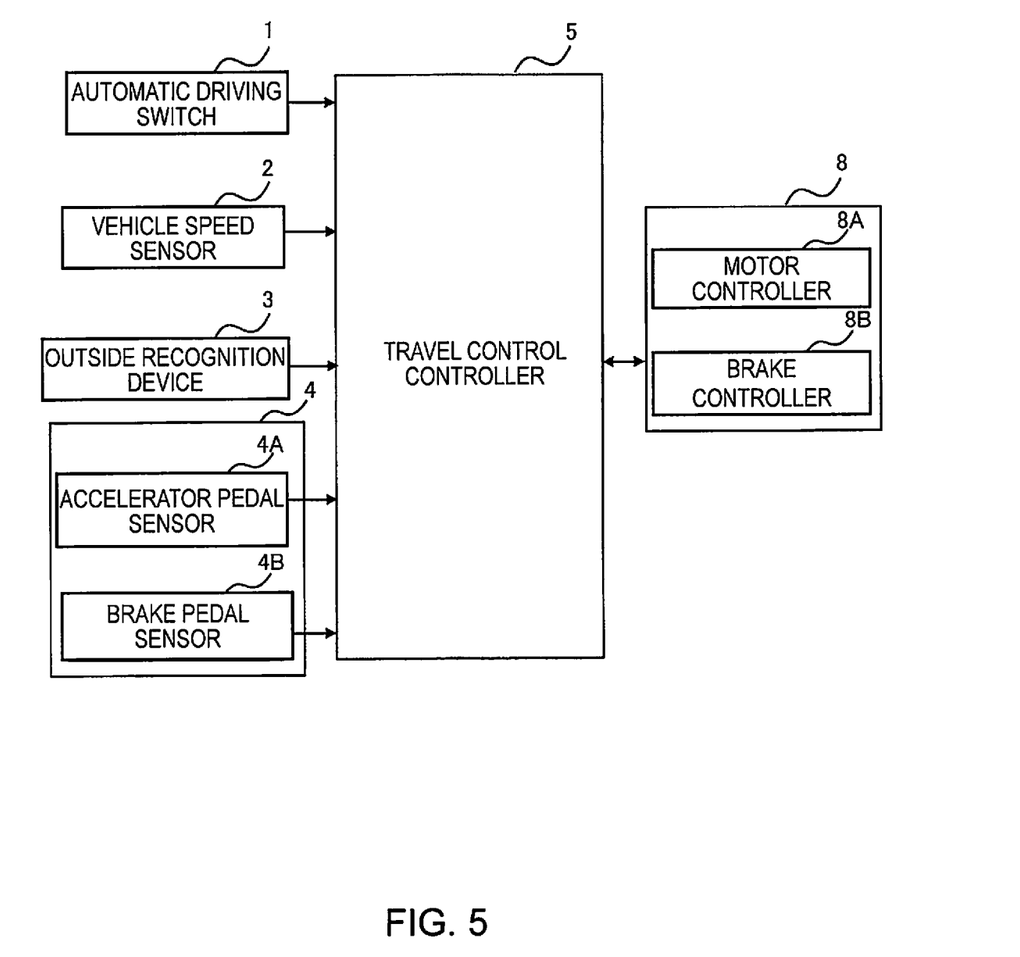
FIG. 5 is a block diagram of a vehicle control system pertaining to a second embodiment.

FIG. 5 is a block diagram of a vehicle control system according to the second embodiment. The control system in FIG. 5 is basically the same as in FIG. 1. However, the vehicle pertaining to the present embodiment is an electric vehicle having an electric motor as the drive source thereof, and an acceleration-deceleration rate control device 8 thereof is therefore provided with a motor controller 8A and a brake controller 8B.

In the second embodiment as well, the travel control controller 5 sets off from the creep torque and subsequently switches to normal control. However, the vehicle pertaining to the present embodiment does not have a torque converter, since the drive source thereof is an electric motor. Therefore, the present embodiment and the first embodiment differ with respect to the timing of switching to normal control after starting. The following description mainly relates to this difference.

Figure 6:
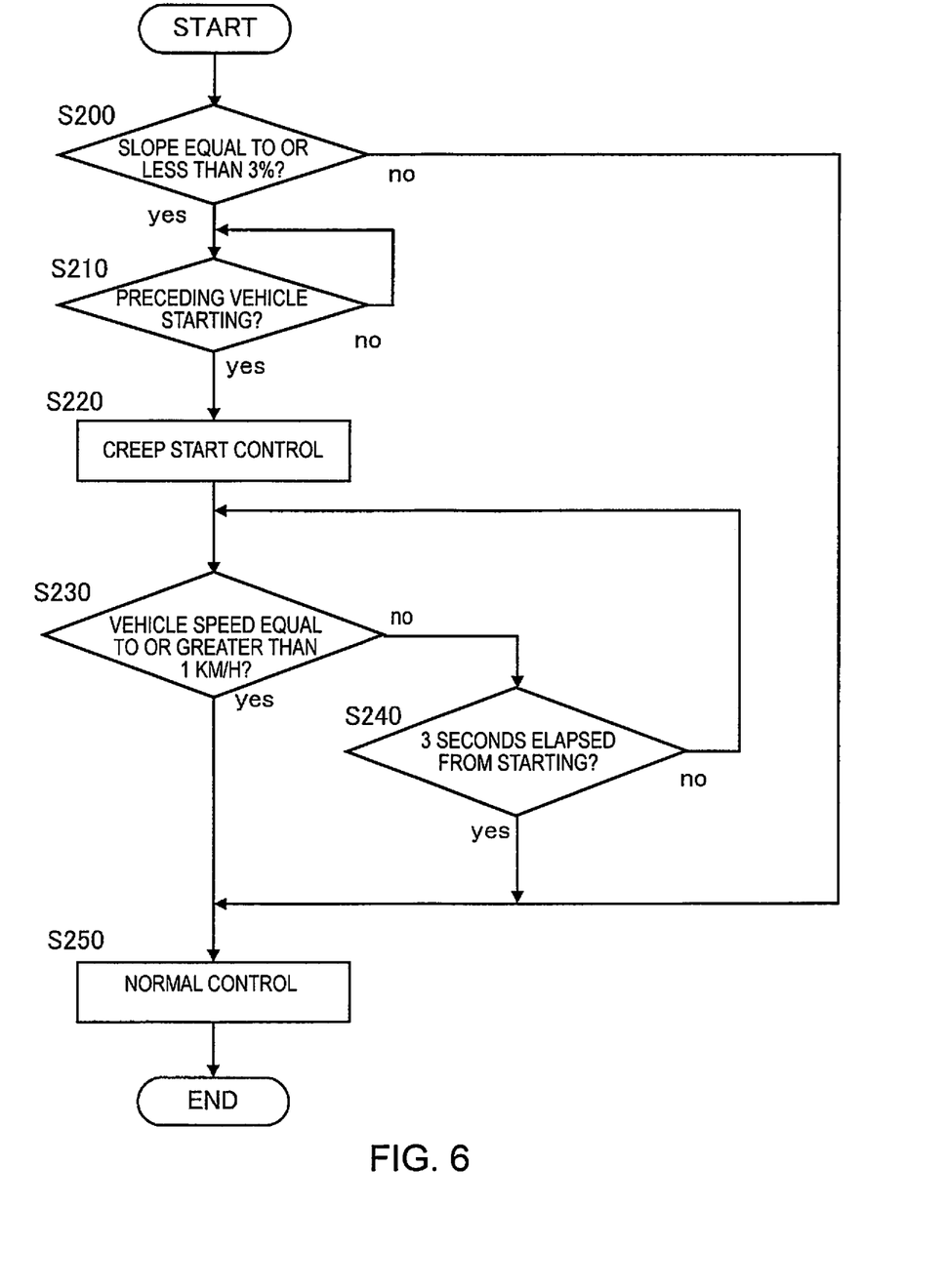
FIG. 6 is a flowchart illustrating a starting control routine pertaining to the second embodiment.

FIG. 6 is a flowchart illustrating a control routine in the starting control pertaining to the second embodiment, programmed in the travel control controller 5. This control routine is executed when the vehicle is stopped during automatic driving.

The processing in step S200 and step S210 is the same as the processing in step S110 and step S110 of FIG. 1, and therefore will not be described.

In step S220, the travel control controller 5 executes creep start control. Specifically, the travel control controller 5 sets a torque necessary for so-called creeping travel as a target torque of the electric motor, and outputs the target torque to the motor controller 8A. The vehicle thereby performs a creep start.

In step S230, the travel control controller 5 determines whether the speed of the host vehicle is equal to or greater than 1 km/h, and when the vehicle speed is equal to or greater than 1 km/h, the travel control controller 5 switches to normal control in step S250, and when the vehicle speed is lower than 1 km/h, the travel control controller 5 executes the processing of step S240.

In step S240, the travel control controller 5 determines whether 3 seconds have elapsed from starting, the same as in step S150 in FIG. 1, and when 3 seconds have elapsed, the travel control controller 5 switches to normal control in step S250, and when 3 seconds have not elapsed, the travel control controller 5 returns to the processing of step S230.

As above, a determination corresponding to step S130 in FIG. 1 is not made in the present embodiment. The reason for this is that the vehicle pertaining to the present embodiment is not provided with a torque converter.

In the determination of step S140 in FIG. 1, the threshold value is 5 km/h, whereas the threshold value in the determination of step S230 in FIG. 6 is 1 km/h. The reason for this is that in an electric vehicle in which power is transmitted without the use of a torque converter, a phenomenon that corresponds to the engine revving caused by delayed response of the torque converter does not occur, and therefore, no problems arise from switching to normal control immediately after starting. In other words, it is sufficient for the threshold value in step S230 to be a numerical value from which it can be determined that the vehicle has begun to move, and the threshold value is not limited to 1 km/h.

As described above, the starting control of the present embodiment is the same as the starting control of the first embodiment with regard to the point that starting is performed by creeping travel from a stationary state, followed by switching to normal control and acceleration to a target speed. However, since a torque converter is not provided, switching to normal control can be performed at an earlier timing in the present embodiment than in the first embodiment.

The vehicle to which the present embodiment can be applied is not limited to an electric vehicle. Even when the drive source is an engine, the present embodiment can be applied when the vehicle is provided with a clutch instead of a torque converter, for example.

Even in a vehicle not provided with a torque converter, as above, by utilizing creeping for starting, and switching to normal control after starting, energy loss at the starting time is suppressed, and fuel efficiency can be enhanced.

In the first and second embodiments, execution creep start control is executed only on a flat road. However, the modification described below can be made so that creep start control is executed other than on a flat road.

Modification

Figure 7:
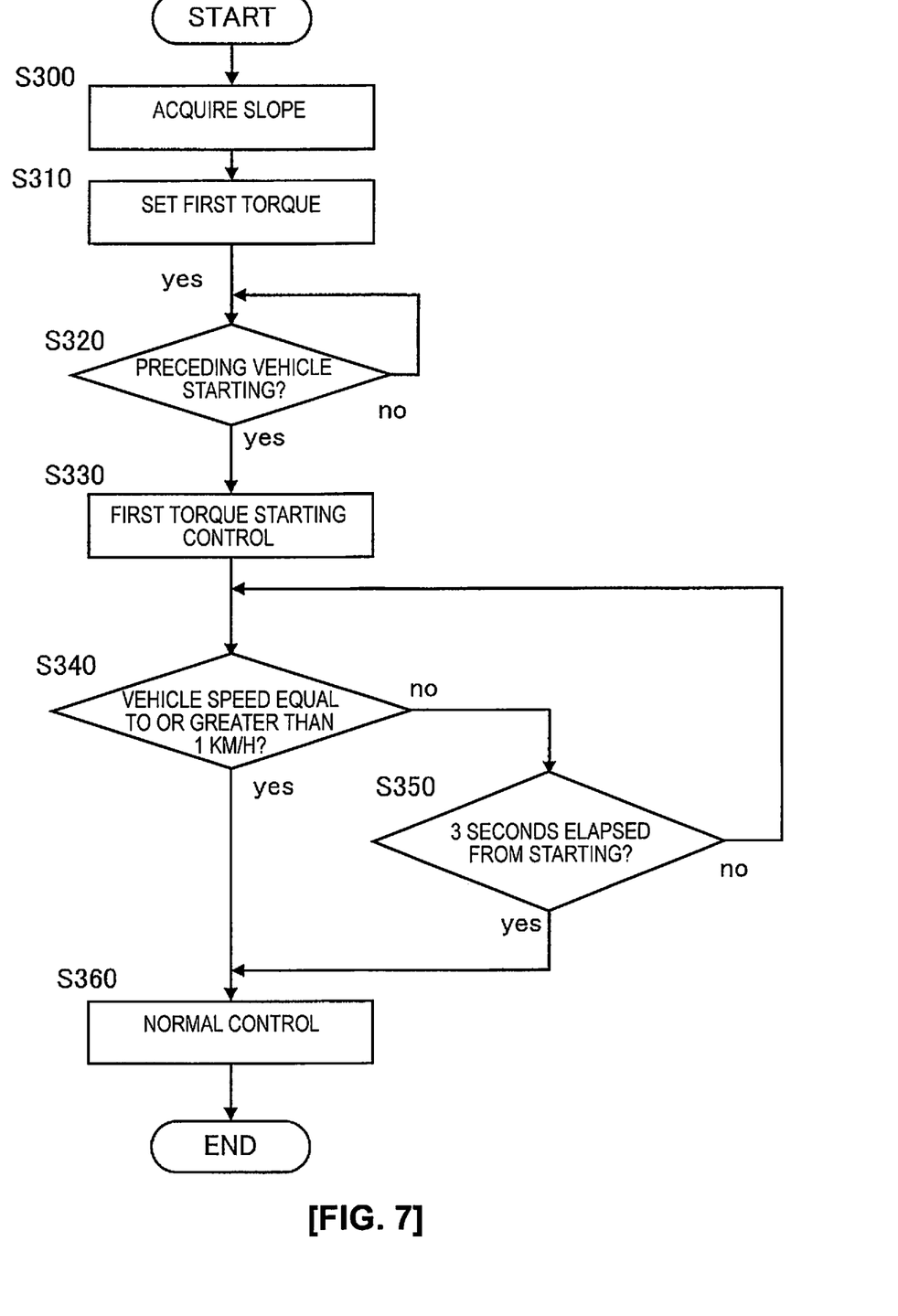
FIG. 7 is a flowchart illustrating a starting control routine pertaining to a modification of the second embodiment.

FIG. 7 is a flowchart illustrating a control routine in starting control pertaining to a modification of the second embodiment. This modification is also within the scope of the present invention. The following description mainly relates to the difference between the flowchart of FIG. 7 and the flowchart of FIG. 6.

In step S300, the travel control controller 5 acquires the slope of the road surface on which the vehicle is stopped. Here, the slope is acquired using an acceleration sensor, the same as in step S100 of FIG. 2 or step S200 of FIG. 6.

In step S310, the travel control controller 5 sets a first torque, which is the drive force at the starting time. Specifically, the travel control controller 5 estimates the starting friction force using a maximum static friction force calculated based on the slope, and sets a drive force greater than the starting friction force as the first torque. Here, the first torque is set to a magnitude such that the vehicle speed after starting is the vehicle speed of general creeping travel.

When the travel control controller 5 has confirmed starting of a preceding vehicle in step S320, the travel control controller 5 sets off at the first torque in step S330. The processing of the subsequent steps S340-S360 is the same as the processing of steps S320-S250 of FIG. 6, and therefore will not be described.

In the present embodiment, the slope of the road surface on which the vehicle is stopped is acquired, and the first drive force is set based on the slope. It is thereby possible to suppress fuel consumption at the starting time and enhance fuel efficiency even on an upward sloping road.

Embodiments of the present invention are described above, but the above embodiments merely represent some applications of the present invention, and are not meant to limit the technical scope of the present invention to the specific configurations of the embodiments described above.

The invention claimed is:

1. A vehicle control method for automatically controlling an acceleration-deceleration rate control of a vehicle including starting and stopping, the vehicle control method comprising:
    performing the starting of the vehicle at a starting time with a first drive force which exceeds a starting friction force, which is a friction force acting on the vehicle at the starting time; and
    switching to a second drive force after performing the starting, the second drive force being greater than the first drive force, and the second drive force being a drive force that is necessary to make a headway distance to a preceding vehicle equal to a pre-set headway distance when there is a preceding vehicle, and being a drive force that is necessary to accelerate to a pre-set vehicle speed when there is no the preceding vehicle.

2. The vehicle control method according to claim 1, wherein
    the switching from the first drive force to the second drive force is performed at a timing at which a vehicle speed of a host vehicle reaches a pre-set switching vehicle speed.

3. The vehicle control method according to claim 2, wherein
    when the vehicle is provided with a torque converter, the pre-set switching vehicle speed is set to a vehicle speed at which a speed ratio of the torque converter is equal to or greater than the speed ratio when a capacity coefficient of the torque converter is at maximum.

4. The vehicle control method according to claim 2, wherein
    the switching from the first drive force to the second drive force is performed even when the pre-set switching vehicle speed is not reached when a predetermined time elapses after the starting time.

5. The vehicle control method according to claim 1, wherein
    the first drive force is a creep torque, and is greater than the starting friction force on a flat road.

6. The vehicle control method according to claim 1, further comprising
    acquiring a slope of a road surface on which the vehicle is stopped, and
    setting the first drive force based on the slope.

7. A vehicle control device for automatically controlling an acceleration-deceleration rate control of a vehicle including starting and stopping, the vehicle control device comprising:
    a travel control unit configured to set a target drive force of a drive source; and
    a drive force control unit configured to control the drive source so as to attain the target drive force;
    the travel control unit being further configured to
    set the target drive force at a starting time to a first drive force which exceeds a starting friction force, which is a friction force acting on the vehicle at the starting time,
    set a second drive force which is a drive force that is necessary to make a headway distance to a preceding vehicle equal to a pre-set headway distance when there is a preceding vehicle, and which is a drive force that is necessary to accelerate to a pre-set vehicle speed when there is no the preceding vehicle, the second drive force being greater than the first drive force, and switch the target drive force to the second drive force after performing the starting.

* * * * *